United States Patent
Ikeda

(10) Patent No.: US 10,579,697 B2
(45) Date of Patent: Mar. 3, 2020

(54) RECEPTION APPARATUS, TRANSMISSION APPARATUS, COMMUNICATION METHOD, COMMUNICATION SYSTEM, AND STORAGE MEDIUM

(71) Applicant: CANON KABUSHIKI KAISHA, Tokyo (JP)

(72) Inventor: Atsushi Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 15/556,581

(22) PCT Filed: Jan. 26, 2016

(86) PCT No.: PCT/JP2016/000378
§ 371 (c)(1),
(2) Date: Sep. 7, 2017

(87) PCT Pub. No.: WO2016/143242
PCT Pub. Date: Sep. 15, 2016

(65) Prior Publication Data
US 2018/0052942 A1    Feb. 22, 2018

(30) Foreign Application Priority Data

Mar. 9, 2015   (JP) ................. 2015-046432

(51) Int. Cl.
*G06F 16/957*    (2019.01)
*G06F 16/958*    (2019.01)
(Continued)

(52) U.S. Cl.
CPC ............ *G06F 16/957* (2019.01); *G06F 13/00* (2013.01); *G06F 16/00* (2019.01); *G06F 16/958* (2019.01);
(Continued)

(58) Field of Classification Search
CPC ...... G06F 16/00; G06F 16/957; G06F 16/958; H04L 67/02; H04L 67/322; H04L 67/42
See application file for complete search history.

(56) References Cited

U.S. PATENT DOCUMENTS

2002/0019853 A1* 2/2002 Vange .................. G06F 9/5027
709/207
2004/0221053 A1* 11/2004 Codella .................. H04L 47/10
709/231

(Continued)

FOREIGN PATENT DOCUMENTS

JP     2003-271508 A    9/2003
JP     2014-021728 A    2/2014

(Continued)

OTHER PUBLICATIONS

Mattias Geniar ("Architecting Websites for the HTTP/2 Era," Jan. 6, 2015, Wayback Machine Archived copy for Jan. 14, 2015, https://web.archive.org/web/20150114095041/https://ma.ttias.be/architecting-websites-http2-era/). (Year: 2015).*

(Continued)

*Primary Examiner* — David R Lazaro
(74) *Attorney, Agent, or Firm* — Canon U.S.A., Inc. IP Division

(57) ABSTRACT

The present invention provides a technique to immediately acquire a specific content item on a web page. A reception apparatus includes a first reception unit configured to receive data representing a configuration of a web page; an assigning unit configured to assign, in a case in which a content item constituting the web page, specified in the data received by the first reception unit, is an image content item to which a link to another content item or a script is set, a high priority to the content item constituting the web page; a notification unit configured to notify a transmission apparatus of a notification message based on the priority assigned by the (Continued)

assigning unit; and a second reception unit configured to receive the content item constituting the web page, transmitted from the transmission apparatus on the basis of the notification message.

18 Claims, 14 Drawing Sheets

(51) Int. Cl.
*H04L 29/08* (2006.01)
*G06F 13/00* (2006.01)
*G06F 16/00* (2019.01)
*H01L 29/06* (2006.01)
*H04L 29/06* (2006.01)

(52) U.S. Cl.
CPC ............ *H04L 67/02* (2013.01); *H04L 67/322* (2013.01); *H04L 67/42* (2013.01)

(56) References Cited

U.S. PATENT DOCUMENTS

| | | | |
|---|---|---|---|
| 2013/0226992 A1* | 8/2013 | Bapst | .............. H04L 67/42 709/203 |
| 2014/0297723 A1 | 10/2014 | Wada | |
| 2015/0271233 A1* | 9/2015 | Bouazizi | .............. H04L 65/60 709/219 |
| 2017/0331918 A1* | 11/2017 | Szabo | .............. H04L 65/601 |

FOREIGN PATENT DOCUMENTS

| | | |
|---|---|---|
| JP | 2014-186513 A | 10/2014 |
| WO | 2015/004276 A2 | 1/2015 |

OTHER PUBLICATIONS

Ohtsu Shigeki, "Recent Progress of HTTP/2 , Standardization", The Journal of the Institute of Electronics, Information and Communication Engineers, Aug. 1, 2014, pp. 727-733, 2.3.

* cited by examiner

[Fig. 1]
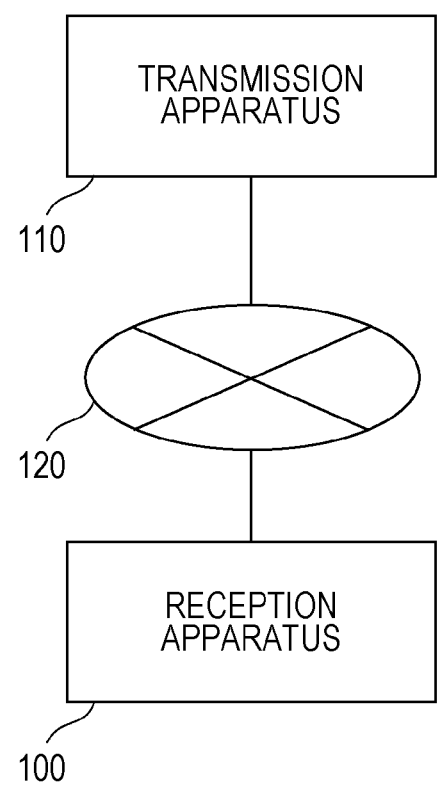

[Fig. 2]
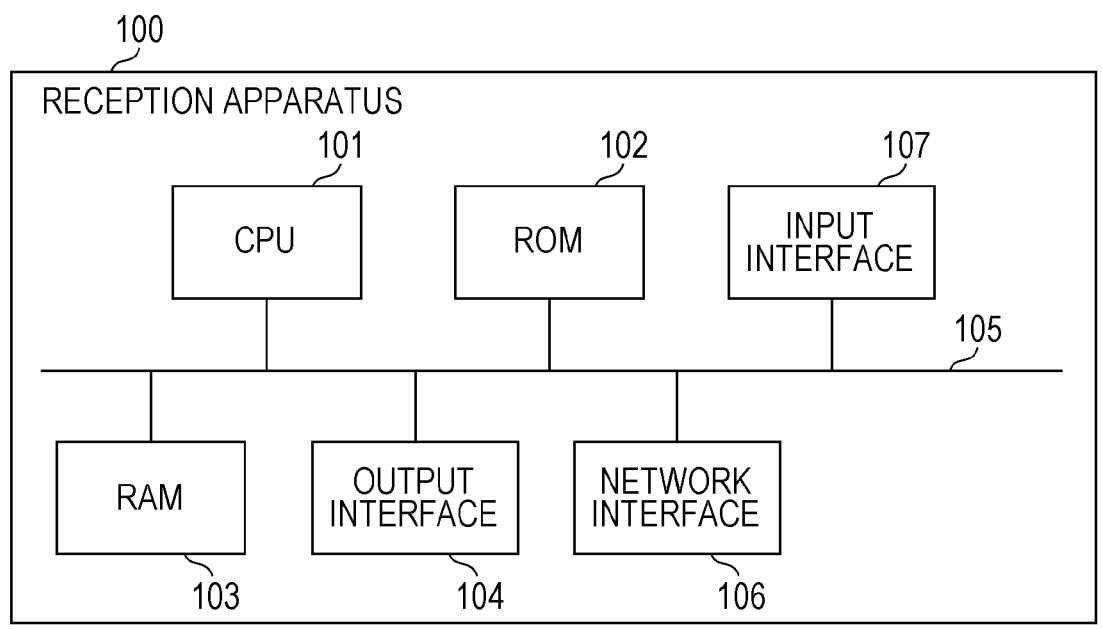

[Fig. 3]
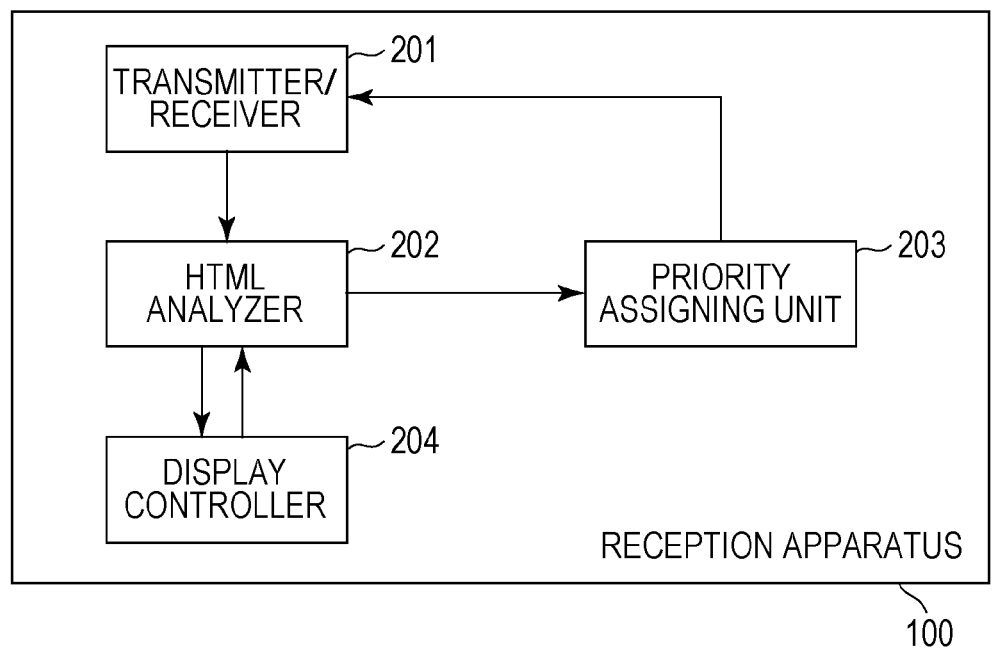

[Fig. 4A]
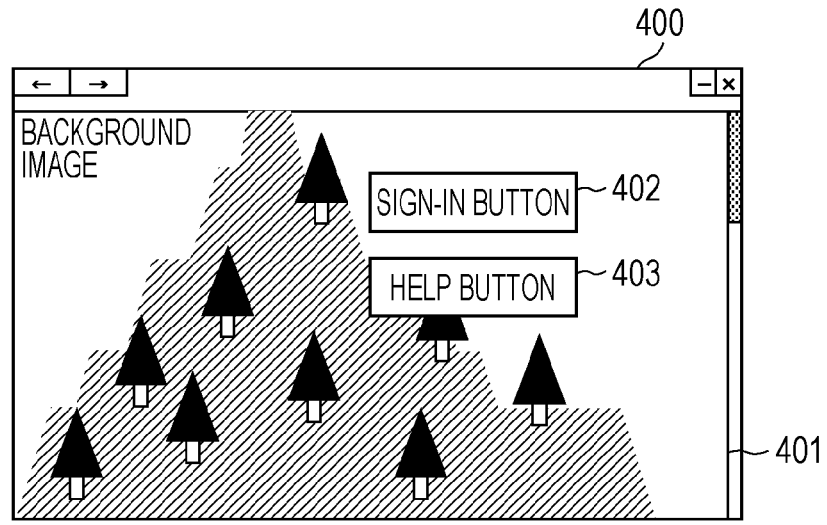
[Fig. 4B]
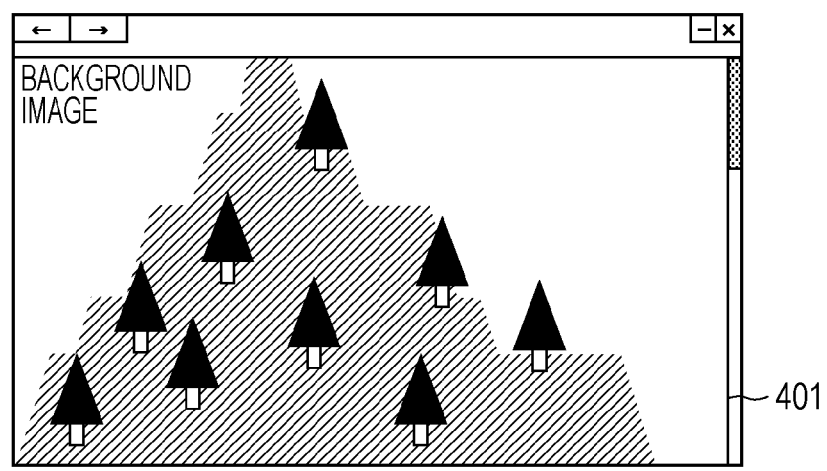
[Fig. 4C]
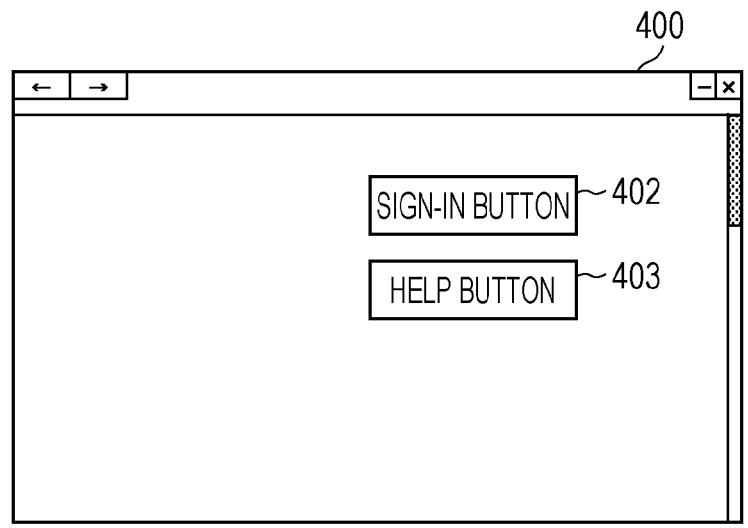

[Fig. 5]
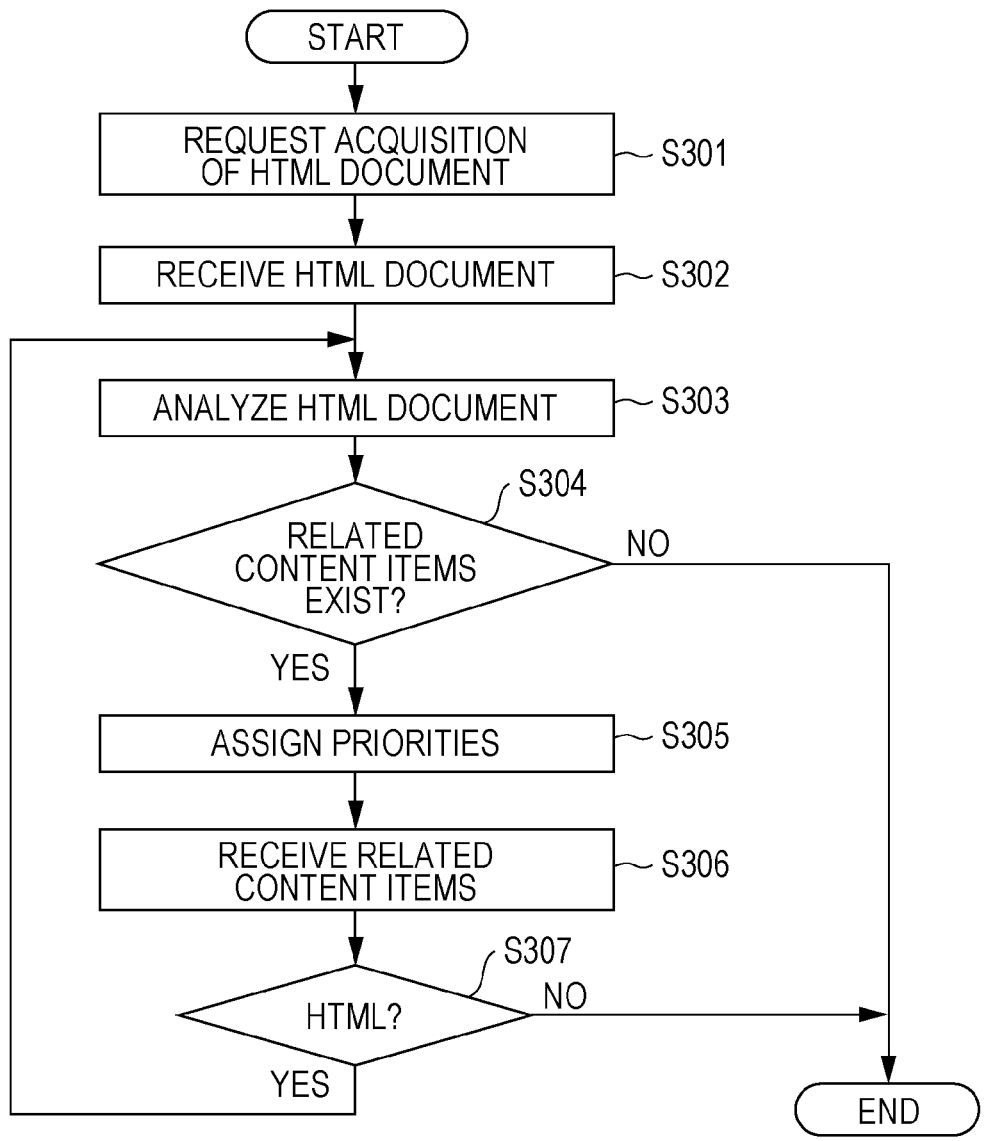

[Fig. 6A]
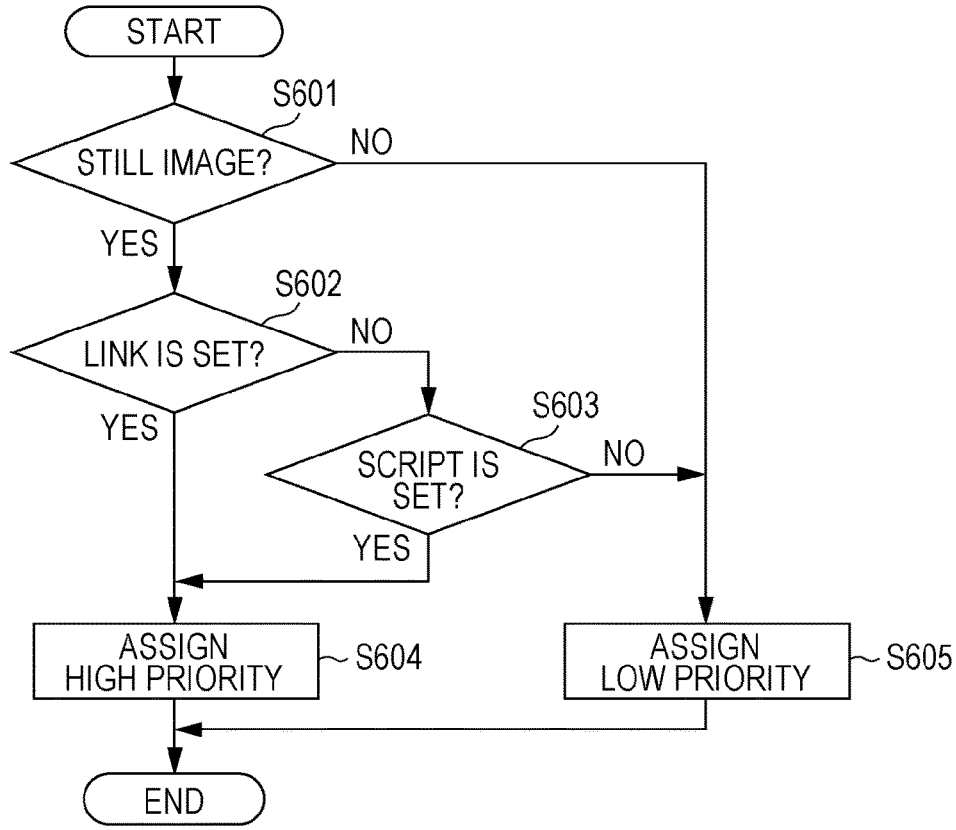
[Fig. 6B]
```
<p id="button1">
 <a href="https://www.example.com/...">
  <img src="button01.jpg" width="200" height="50">
 </a>
</p>
```
[Fig. 6C]
```
<p id="button2">
 <img onclick="onclick="location.href='http://www.example.com/...' " "
   src="button02.jpg" width="200" height="50">
</p>
```
[Fig. 6D]
```
<p id="background1">
 <img src="background01.jpg" width="800" height="600">
</p>
```

[Fig. 7A]
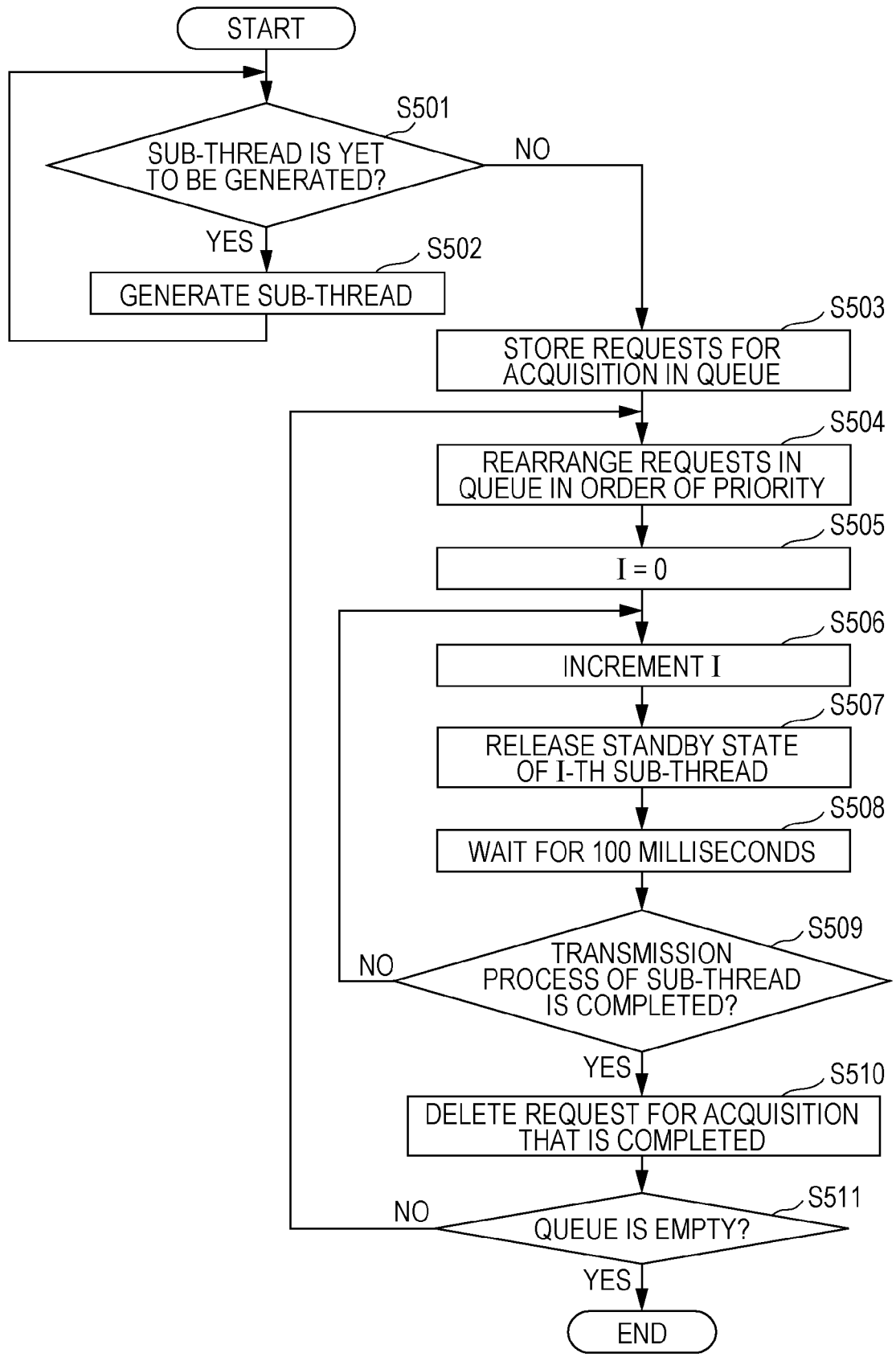

[Fig. 7B]
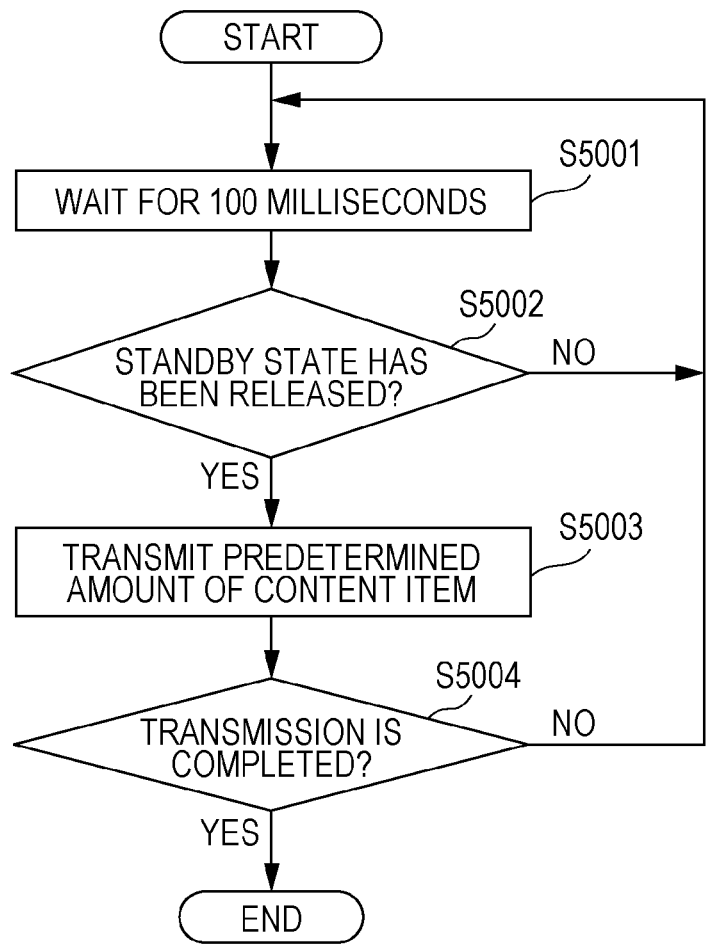

[Fig. 8A]
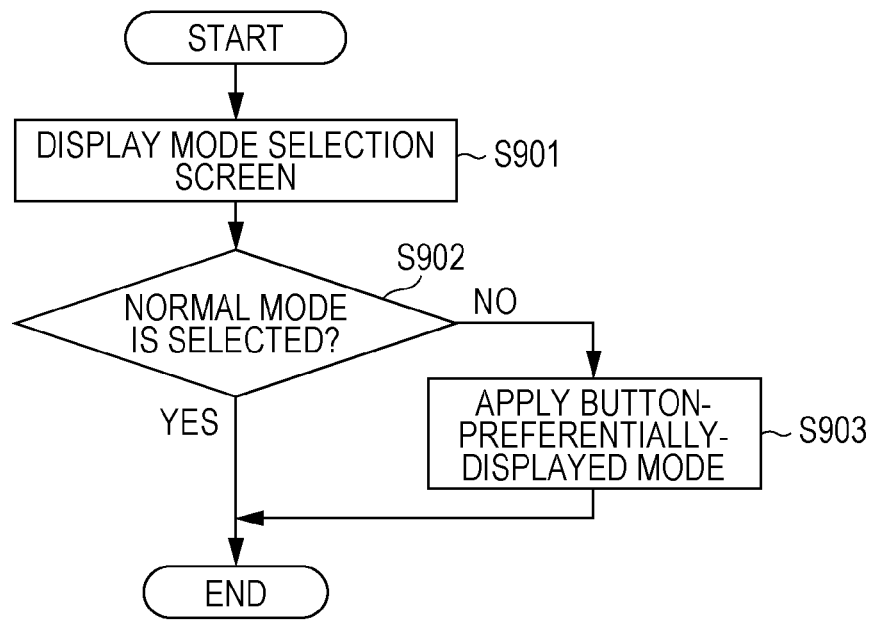
[Fig. 8B]
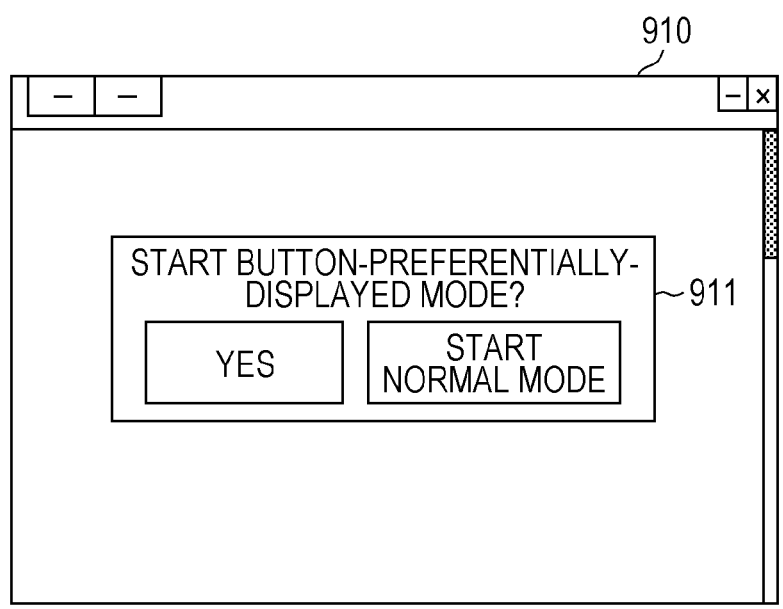

[Fig. 9A]
```
<html>
<body width="1000px" height="800px">
<img src="image01.jpg" width="100px" height="50px">
<img src="image02.jpg" onclick="..." width="100px" height="50px">
</body>
</html>
```
[Fig. 9B]
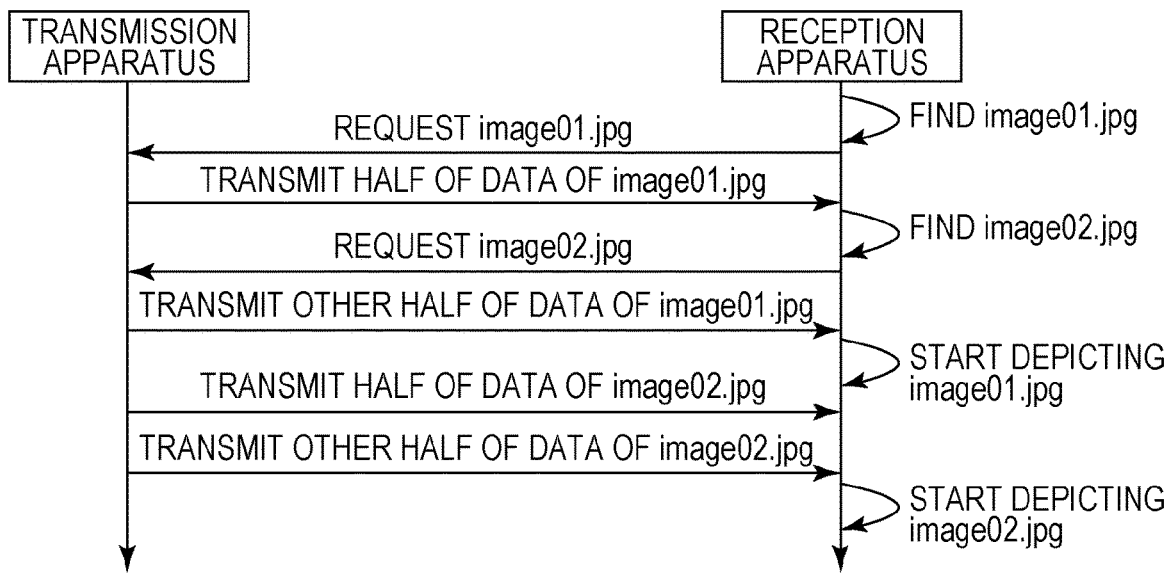
[Fig. 9C]
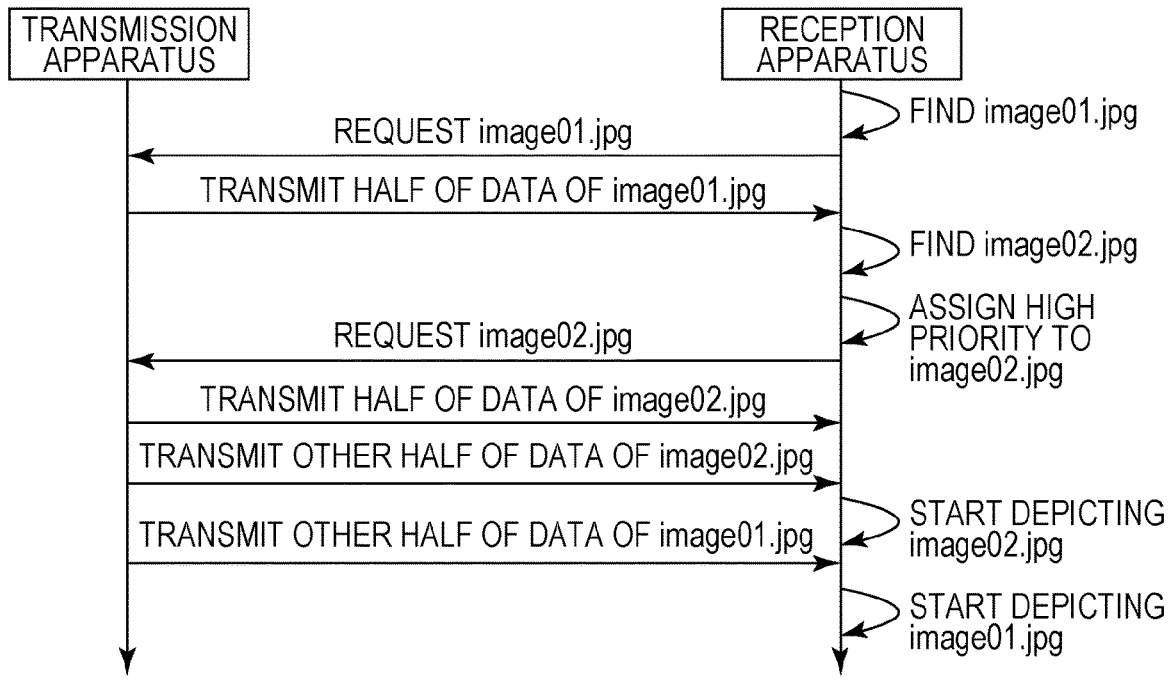

[Fig. 10A]
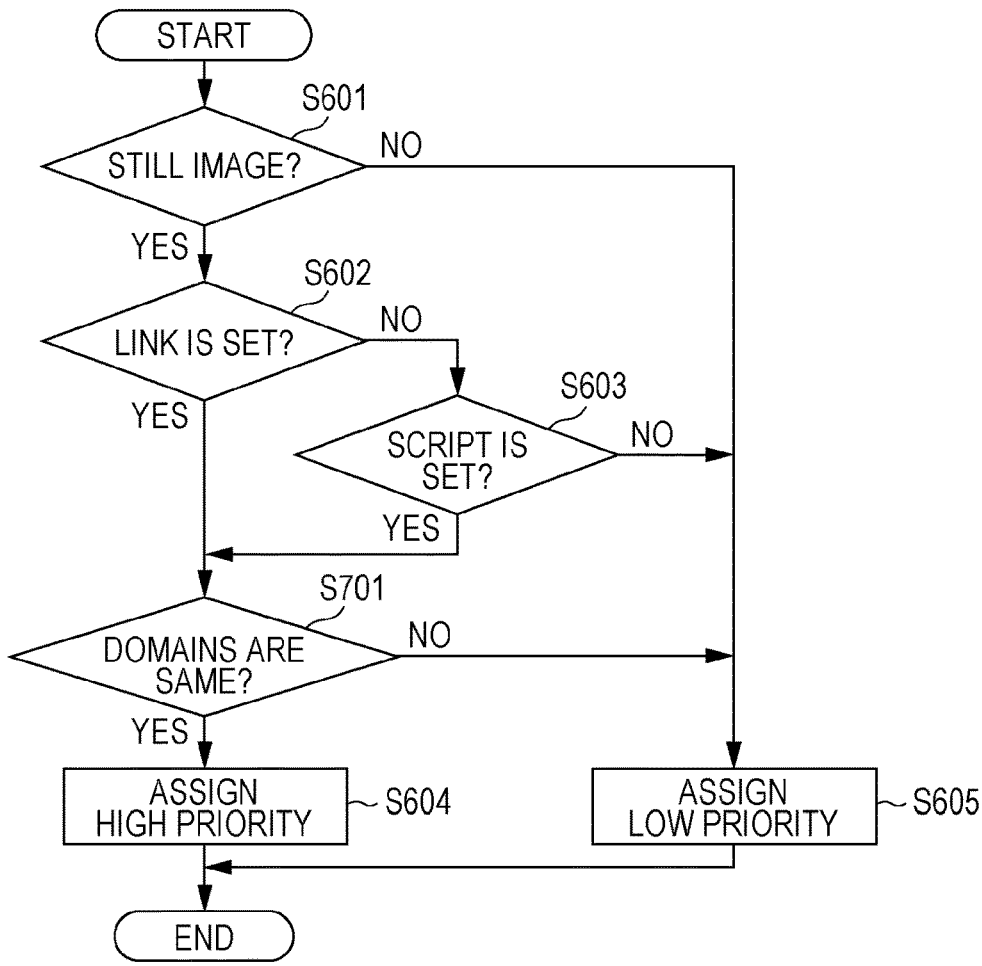
[Fig. 10B]
```
<p id="button1">
  <a href="https://www.example.com/menu.html">
    <img src="button01.jpg" width="200" height="50">
  </a>
</p>
```
[Fig. 10C]
```
<p id="button1">
  <a href="menu.html">
    <img src="button02.jpg" width="200" height="50">
  </a>
</p>
```
[Fig. 10D]
```
<p id="button1">
  <a href="https://www.other-page.com/">
    <img src="button03.jpg" width="200" height="50">
  </a>
</p>
```

[Fig. 11A]
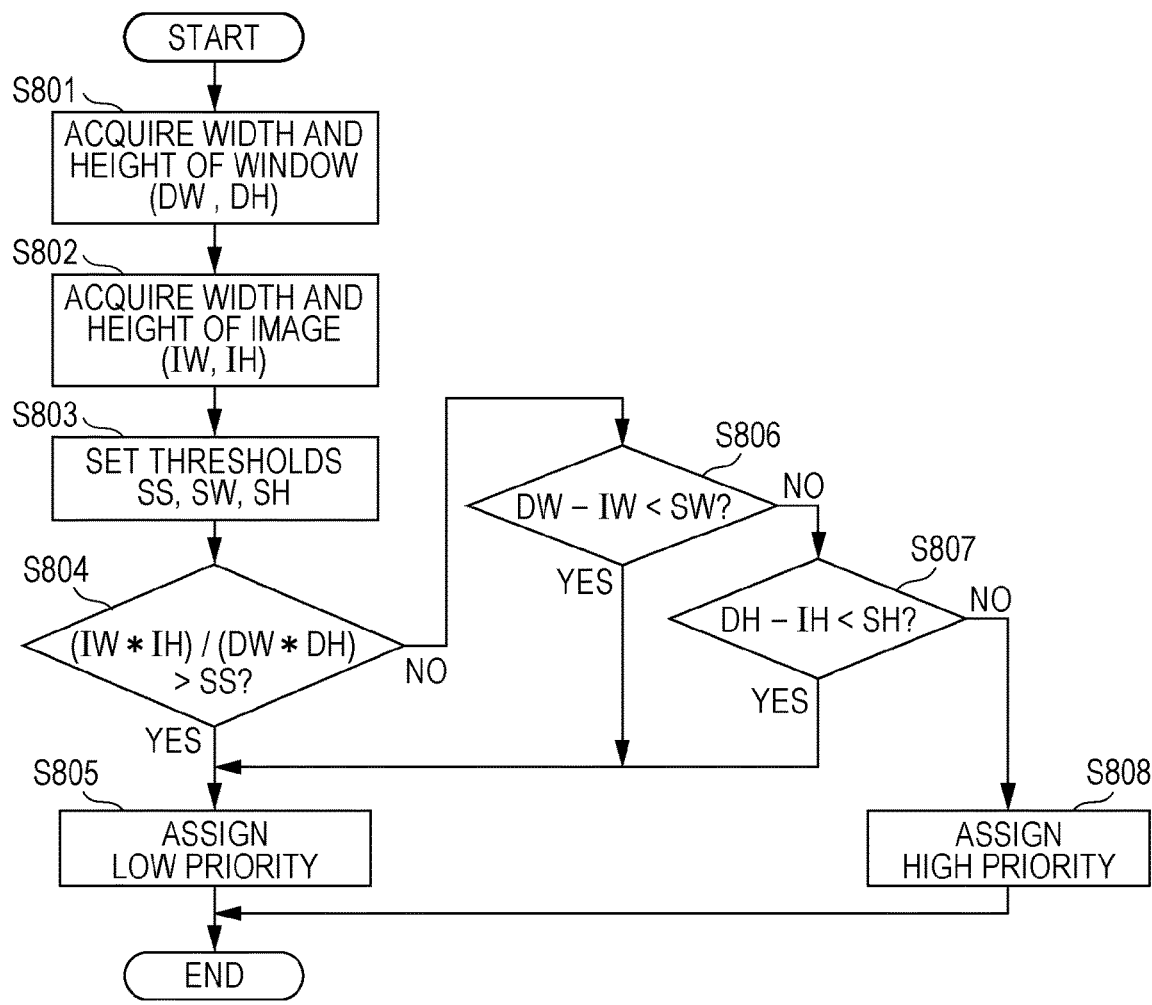

[Fig. 11B]
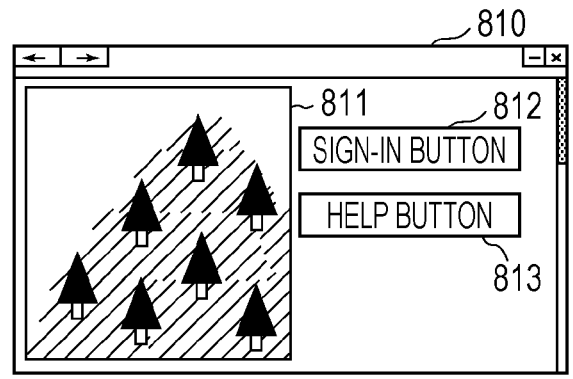
[Fig. 11C]
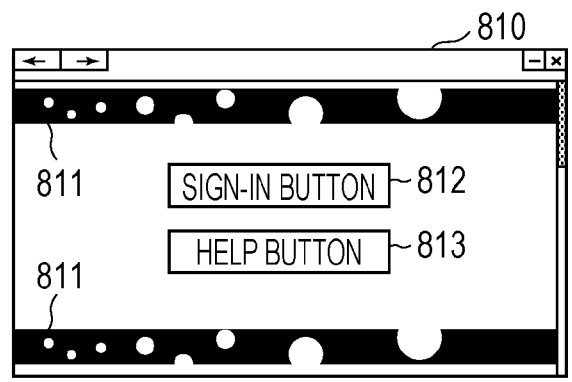
[Fig. 11D]
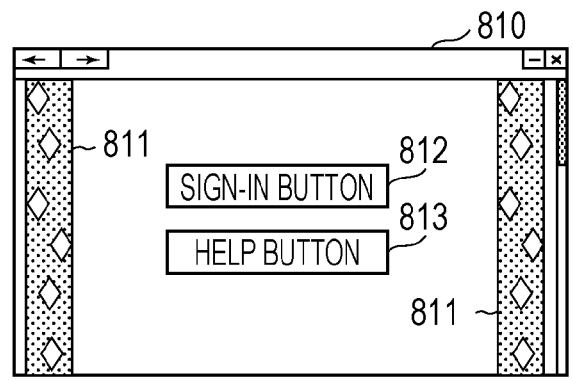

[Fig. 12A]
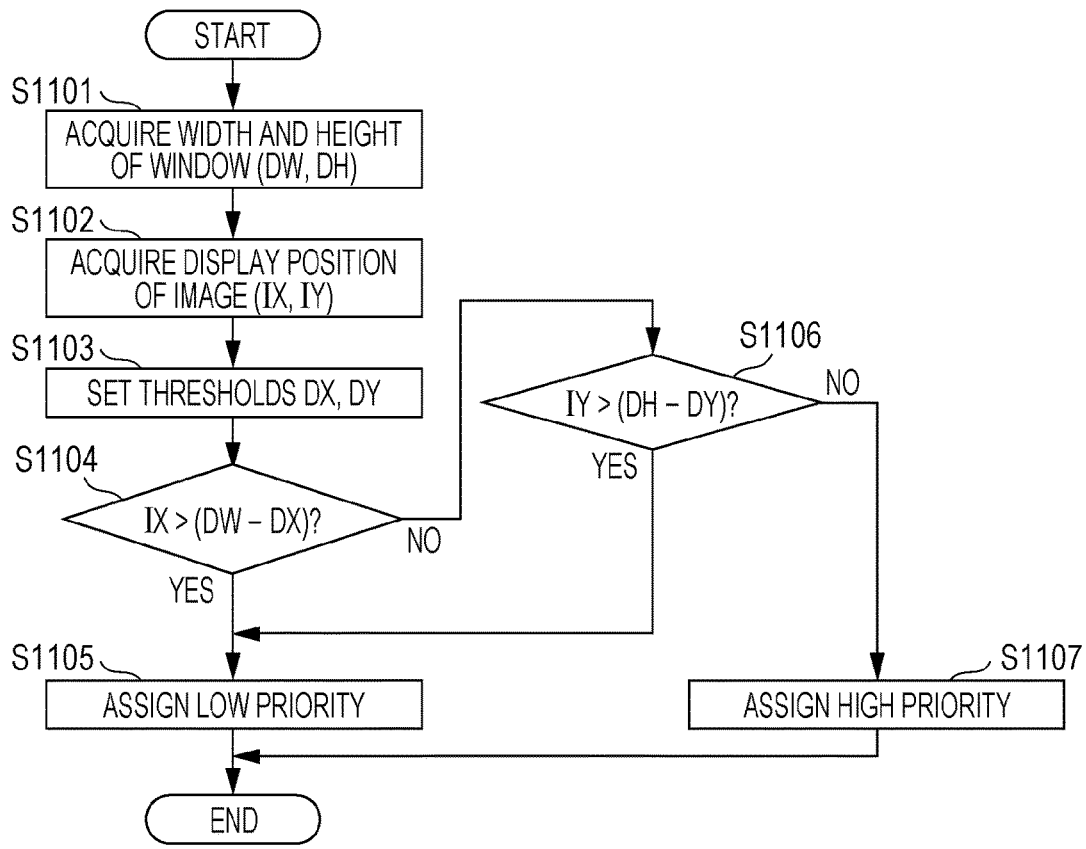
[Fig. 12B]
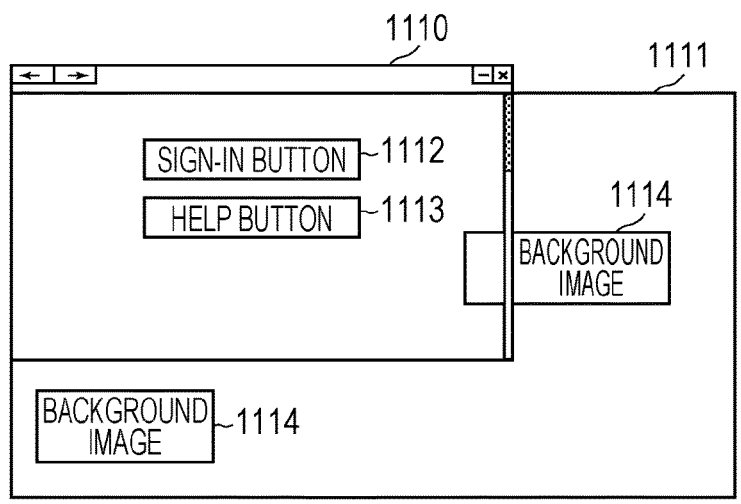

RECEPTION APPARATUS, TRANSMISSION APPARATUS, COMMUNICATION METHOD, COMMUNICATION SYSTEM, AND STORAGE MEDIUM

TECHNICAL FIELD

The present invention relates to a communication method for transmitting and receiving content items by using logical connections.

BACKGROUND ART

To display a web page, a user inputs a URL (uniform resource locator) to a web browser. The web browser acquires, from a server apparatus, an HTML (hypertext markup language) document specified in the URL that has been input by the user. As a communication protocol to acquire the HTML document, HTTP (hypertext transfer protocol) is used. The web browser then displays the web page as contained in the acquired HTML document. The web page includes, in addition to text, content items such as a CSS (cascading style sheets) file, a JavaScript (registered trademark) file, a still image, a moving image, and audio; the HTML document contains URLs that specify those content items. The web browser displays the web page on the basis of the HTML document and concurrently acquires, from the server apparatus, content items that constitute the web page. PTL 1 discloses a technique to display a web page in a form suitable for a mobile terminal after downloading an HTML document of a web site and then downloading image data specified in the HTML document.

The IETF (Internet Engineering Task Force) is now developing the HTTP/2 standard as a version of HTTP. According to HTTP/2, it is possible to establish a connection between the server apparatus and a client apparatus and to establish a plurality of independent communication sequences (called streams) in the connection. It is also possible to transmit and receive messages between the server apparatus and the client apparatus on each stream.

However, such a technique of the related art may lead to slow acquisition of content items that need to be acquired immediately.

For example, in a case in which a user views a web page on a client apparatus that receives data by using a plurality of streams, a web browser concurrently acquires a plurality of content items constituting the web page from a server apparatus and displays the content items in the order in which acquisition is completed. The content items constituting the web page include some content items related to interaction. The term "interaction" herein means that a web page executes a dynamic process in response to a user operation on a content item on the web page. Specifically, examples of the interaction include display of another web page in response to clicking an image to which a link is set and signing into a web service in response to selecting a sign-in button. Until the web browser displays a content item related to interaction, the user cannot operate the web page. Accordingly, slow acquisition of the content item related to interaction reduces the convenience of the web page.

CITATION LIST

Patent Literature

PTL 1: Japanese Patent Laid-Open No. 2003-271508

SUMMARY OF INVENTION

The present invention provides a technique to immediately acquire a specific content item on a web page.

A reception apparatus includes a first reception unit configured to receive data representing a configuration of a web page; an assigning unit configured to assign, in a case in which a content item constituting the web page, specified in the data received by the first reception unit, is an image content item to which a link to another content item or a script is set, a high priority to the content item constituting the web page; a notification unit configured to notify a transmission apparatus of a notification message based on the priority assigned by the assigning unit; and a second reception unit configured to receive the content item constituting the web page, transmitted from the transmission apparatus on the basis of the notification message.

Further features of the present invention will become apparent from the following description of exemplary embodiments with reference to the attached drawings.

BRIEF DESCRIPTION OF DRAWINGS

FIG. 1 illustrates an example of a configuration of a communication system according to an embodiment.

FIG. 2 is a block diagram illustrating an example of a hardware configuration of a reception apparatus according to the embodiment.

FIG. 3 is a block diagram illustrating an example of a module configuration of the reception apparatus according to the embodiment.

FIG. 4A illustrates an example of display of a web page according to an embodiment.

FIG. 4B illustrates an example of partial display of the web page illustrated in FIG. 4A.

FIG. 4C illustrates an example of partial display of the web page illustrated in FIG. 4A.

FIG. 5 is a flowchart illustrating an operation that occurs when the reception apparatus according to the embodiment receives content items.

FIG. 6A illustrates a method by which the reception apparatus according to the embodiment assigns priorities.

FIG. 6B illustrates an example of an excerpt of a description related to display of an interactive button image in an HTML file.

FIG. 6C illustrates an example of an excerpt of a description related to display of an interactive button image in the HTML file.

FIG. 6D illustrates an example of an excerpt of a description related to display of a background image in the HTML file.

FIG. 7A is a flowchart illustrating an operation that occurs when a transmission apparatus according to the embodiment transmits content items.

FIG. 7B is a flowchart illustrating an operation that occurs when the transmission apparatus according to the embodiment transmits content items.

FIG. 8A illustrates a mode selection function according to the embodiment.

FIG. 8B illustrates the mode selection function according to the embodiment.

FIG. 9A illustrates an example of an excerpt of a description of an HTML document.

FIG. 9B is a sequence diagram illustrating an operation of transmitting and receiving content items in a case of not employing the embodiment.

FIG. 9C is a sequence diagram illustrating an operation of transmitting and receiving content items according to the embodiment.

FIG. 10A illustrates a method for assigning priorities based on a domain of a URL corresponding to a link or script according to an embodiment.

FIG. 10B illustrates an example of designating a link destination by using an absolute path.

FIG. 10C illustrates an example of designating the link destination by using a relative path.

FIG. 10D illustrates an example of an excerpt of a description related to display of a button image to which a link to another web service is set, the web service being managed by another domain.

FIG. 11A illustrates a method for assigning priorities based on a display size of an image according to an embodiment.

FIG. 11B illustrates an example of a case in which an area of a background image occupies a certain ratio or more of an area of a window in a web browser.

FIG. 11C illustrates an example of a case in which a width of a background image occupies a certain ratio or more of a width of a window.

FIG. 11D illustrates an example of a case in which a height of a background image occupies a certain ratio or more of a height of a window.

FIG. 12A illustrates a method for assigning priorities based on a display position of an image according to an embodiment.

FIG. 12B illustrates an example of display in which an entire web page is not displayed in a display range of an initial screen of a web browser.

DESCRIPTION OF EMBODIMENTS

Embodiments of the present invention will be described below. The embodiments shall not limit the present invention according to the claims, and all combinations of features described in the embodiments are not necessarily essential to the present invention.

First Embodiment

This embodiment will describe an example in which, in a case in which a user views a web page constituted by a plurality of content items in a web browser, a reception apparatus 100 determines a content item related to interaction as being particularly necessary and preferentially downloads such a content item. The term "interaction" herein means that a web page executes a dynamic process in response to a user operation on a content item on the web page.

Specific examples will be described below. FIGS. 4A, 4B, and 4C each illustrate an example of display of a web page. FIG. 4A illustrates an example of a home page of an image sharing service, in which a background image 401, a sign-in button 402, and a help button 403 are arranged in a window in a web browser 400.

FIGS. 4B and 4C each illustrate the web browser 400 partially displaying the web page illustrated in FIG. 4A. FIG. 4B illustrates a web page in a process of first displaying the background image 401 and than displaying the sign-in button 402 and the help button 403. FIG. 4C illustrates a web page in a process of first displaying the sign-in button 402 and the help button 403 and then displaying the background image 401. In the state illustrated in FIG. 4B, since the sign-in button 402 and the help button 403 related to interaction are yet to be displayed, the user needs to wait for the sign-in button 402 or the help button 403 to be displayed in order to use functions of the image sharing service. In contrast, in the state illustrated in FIG. 4C, since the sign-in button 402 and the help button 403 are displayed earlier than the background image 401, the user can use functions of the image sharing service without waiting for the background image 401 to be displayed.

Accordingly, this embodiment will describe a mechanism for preferentially downloading a content item related to interaction as illustrated in FIG. 4C.

System Configuration

FIG. 1 illustrates an example of a configuration of a communication system. The communication system includes a transmission apparatus 110 and the reception apparatus (communication apparatus) 100, which are connected to each other via a network 120. The reception apparatus 100 receives a content item from the transmission apparatus 110 by using a logical connection established on the network 120 between the reception apparatus 100 and the transmission apparatus 110. The protocol in the transmission/reception of data between the transmission apparatus 110 and the reception apparatus 100 is HTTP/2. However, a protocol other than HTTP/2 may be used.

The reception apparatus 100 is a client apparatus having a display control function of causing a display apparatus to display a web page in a web browser, an operation function of receiving a user operation through an input apparatus, and a communication function. The display apparatus and the input apparatus may be integrated with the reception apparatus 100 or may be independent apparatuses connected to the reception apparatus 100. Examples of the reception apparatus 100 include a camera, a personal computer, a television, and a smartphone. The transmission apparatus 110 is a server apparatus having a communication function of transmitting, for example, an HTML document and a content item specified by the HTML document. The network 120 is a network to which the reception apparatus 100 and the transmission apparatus 110 are connected. Examples of the network 120 include a wired LAN (local area network), a wireless LAN, a WAN (wide area network), and the Internet.

This embodiment describes an example of a case of using an HTML document as data showing a configuration of a web page. However, an XHTML (extensible hypertext markup language) document instead of the HTML document may also be used as data showing a configuration of a web page, for example.

Hardware Configuration

FIG. 2 is a block diagram illustrating an example of a hardware configuration of the reception apparatus 100. The reception apparatus 100 includes a CPU (central processing unit) 101, a ROM (read-only memory) 102, a RAM (random access memory) 103, an output interface 104, a bus 105, a network interface 106, and an input interface 107.

The CPU 101 controls the entire reception apparatus 100. The ROM 102 stores a program and a parameter that do not need to change. The RAM 103 temporarily stores a program and data supplied from an external apparatus, for example. The output interface 104 outputs, to the display apparatus, a display screen based on the data retained by the reception apparatus 100 or the supplied data. The bus 105 connects the components of the reception apparatus 100 such that the components can communicate with one another. The network interface 106 is connected to a network line such as a line to the Internet. The input interface 107 receives an input from an input device such as a pointing device (e.g., a touch sensor or a mouse) or a keyboard operated by the user. The configuration is not limited to the above, and the reception apparatus 100 may include a secondary storage device such as a memory card or a hard disk fixed to the reception apparatus 100. Alternatively, an external storage device such as an FD (flexible disk) or an optical disc such as a CD (compact disc), a magnetic card, an optical card, an IC card, and a memory card may be detachably provided to the reception apparatus 100.

The transmission apparatus 110 has substantially the same hardware configuration as the reception apparatus 100.

Module Configuration

FIG. 3 is a block diagram illustrating an example of a module configuration of the reception apparatus 100. The reception apparatus 100 includes a transmitter/receiver 201, an HTML analyzer 202, a priority assigning unit 203, and a display controller 204. Each module is realized by the CPU 101 loading the program stored in the ROM 102 to the RAM 103 and executing processes corresponding to flowcharts described later. For example, in a case of a hardware-implemented process instead of software-implemented process by using the CPU 101, an operator or circuit is configured so as to correspond to the processes of each module described here.

The transmitter/receiver 201 transmits/receives data to/from the transmission apparatus 110 via the network 120 by using a stream contained by HTTP/2. Here, the stream contained by HTTP/2 is a logical connection for managing an order of messages such as requests for acquisition of content items to be transmitted from the reception apparatus 100 to the transmission apparatus 110 and the content items to be transmitted from the reception apparatus 100 to the transmission apparatus 110. Note that the logical connection used by the reception apparatus 100 and the transmission apparatus 110 is not limited to the stream contained by HTTP/2. The transmission apparatus 110 needs to transmit a response in accordance with the order of requests for acquisition received from the reception apparatus 100 on each stream. However, in a case in which the transmission apparatus 110 and the reception apparatus 100 perform communication by using a plurality of streams, each stream independently manages the order of requests for acquisition and responses, and transmission statuses on each stream do not directly affect transmission statuses on other streams.

The transmitter/receiver 201 transmits requests for acquisition, receives an HTML document and related content items from the transmission apparatus 110, and notifies the transmission apparatus 110 of priorities of streams used for transmission/reception of the content items. In this embodiment, the transmitter/receiver 201 concurrently receives the content items by using different streams. The expression "to concurrently receive the content items" herein means that the transmitter/receiver 201 receives a plurality of content items in a time division manner by using a plurality of streams. The HTML analyzer 202 analyzes the HTML document received by the transmitter/receiver 201 and specifies the related content items constituting a web page to be displayed on the basis of the HTML document. The priority assigning unit 203 assigns the priorities of streams used to receive the content items specified by the HTML analyzer 202. Details of a method for assigning the priorities of streams will be described later. The display controller 204 causes a display apparatus such as a display to display an image of a web page on the basis of the HTML document and the content items received by the transmitter/receiver 201, which are specified in the HTML document by the HTML analyzer 202.

Flow of Receiving Content Items

FIG. 5 is a flowchart illustrating an operation that occurs when the reception apparatus 100 receives the content items. A process illustrated in FIG. 5 starts in response to a user operation for acquiring a web page being input to the reception apparatus 100. However, the timing at which the process of FIG. 5 starts is not limited to this timing.

In step S301, the transmitter/receiver 201 transmits, to the transmission apparatus 110, a request for acquisition of an HTML document specified by a URL that is designated by a user. To designate the URL, the user may directly input the URL to a web browser, click a link, or select the URL from a bookmark, for example. In step S302, the transmitter/receiver 201 receives the HTML document transmitted from the transmission apparatus 110 in response to the request for acquisition in step S301.

In step S303, the HTML analyzer 202 analyzes the HTML document received by the transmitter/receiver 201 in step S302 and specifies content items contained in the HTML document. In step S304, the HTML analyzer 202 determines whether or not the HTML document contains related content items. If the HTML document contains no related content items, the process ends; if the HTML document contains any related content items, the process proceeds to step S305.

In step S305, the priority assigning unit 203 assigns priorities of the content items related to the HTML document on the basis of attribute information of the content items. Examples of the attribute information of a content item include a type of the content item, presence and absence of a link to another content item or script set to the content item, a URL corresponding to a link or script set to the content item, and a display region of the content item on a page displayed on the basis of the HTML document. Other information related to the content items may be used as a criterion for assigning the priorities. Details of a method for assigning the priorities will be described later.

In step S306, the transmitter/receiver 201 concurrently acquires the content items on the basis of the priorities assigned by the priority assigning unit 203 in step S305. Specifically, the transmitter/receiver 201 establishes a plurality of streams different for the content items between the reception apparatus 100 and the transmission apparatus 110 and assigns the priorities of the streams on the basis of the priorities of the corresponding content items. For example, in HTTP/2, in advance of initiating a stream, the transmitter/receiver 201 can notify the transmission apparatus 110 of a priority of a stream to be newly established between the reception apparatus 100 and the transmission apparatus 110 by including prioritization information in a HEADERS frame to be transmitted to the transmission apparatus 110. Further, the transmitter/receiver 201 can also notify the transmission apparatus 110 of a priority of a stream that has been established already by transmitting a PRIORITY frame to the transmission apparatus 110 by using the established stream. In such a manner, the transmitter/receiver 201 notifies the transmission apparatus 110 of a message including at least any of the HEADERS frame and the PRIORITY frame contained by HTTP/2 as a message based on the priorities assigned by the priority assigning unit 203. However, the notification method of the priority of the stream is not limited to this method, and other methods may be employed. Once the priority assigning unit 203 assigns the priorities of the streams, the transmitter/receiver 201 transmits the requests for acquisition of the content items to the transmission apparatus 110 and receives the plurality of content items transmitted from the transmission apparatus 110 by using the plurality of streams established between the reception apparatus 100 and the transmission apparatus 110. In this event, the transmission apparatus 110 allocates transmission resources to the streams on the basis of the messages including information on the priorities of the streams provided from the transmitter/receiver 201. The term "transmission resources" herein means, for example, the time, memory capacity, and bandwidth necessary for the CPU to transmit data. The transmission apparatus 110 may allocate at least one type of transmission resource on the basis of the priorities and may allocate the other transmission resources regardless of the priorities. By the transmission apparatus 110 allocating the transmission resources based on the provided priorities, there is a high possibility that the reception apparatus 100 may immediately acquire a content item corresponding to a stream with a high priority.

In step S307, the HTML analyzer 202 determines whether or not the content items received by the transmitter/receiver 201 in step S306 include an HTML file (HTML document). As a result of the determination in step S307, if the received content items include an HTML file, the process returns to step S303; if the received content items do not include an HTML file, the process ends.

This embodiment describes mainly the case in which the reception apparatus 100 receives the HTML document and the related content items from the transmission apparatus 110. However, the present invention is not limited to this case, and the reception apparatus 100 may receive the HTML document and the related content items separately from different transmission apparatuses or may receive the related content items from a plurality of transmission apparatuses.

Flow of Assigning Priorities

A method by which the reception apparatus 100 assigns the priorities in step S305 will be specifically described with reference to FIGS. 6A, 6B, 6C, and 6D. FIG. 6A is a flowchart illustrating an example of a process in which the priority assigning unit 203 assigns the priorities in step S305. FIGS. 6B and 6C are examples of excerpts of a description related to display of an interactive button image in an HTML file. FIG. 6D illustrates an example of an excerpt of a description related to display of a background image in the HTML file.

The description in FIG. 6B includes three types of elements: <p>, <a>, and <img>. In an HTML document, the <p> element represents a paragraph, the <a> element represents a link, and the <img> element represents an image. That is, the description in FIG. 6B indicates that the web page includes an image that has a function of transitioning to a linked web page when clicked.

The description in FIG. 6C includes two types of elements: <p> and <img>. As in the description in FIG. 6B, the description in FIG. 6C indicates that the web page includes an image that has a function of transitioning to another web page when clicked. In the description in FIG. 6C, an operation of the transition to the other web page is defined in JavaScript (registered trademark). A part in which the operation is defined in JavaScript (registered trademark) in the description in FIG. 6C is the part "onclick=" . . . "" in the <img> element. The description "onclick=" . . . "" is referred to as a script attribute.

The description in FIG. 6D includes two types of elements: <p> and <img>. The description in FIG. 6D also indicates that the web page includes an image but does not include an <a> element or a script attribute. Therefore, the image displayed in accordance with the description in FIG. 6D does not have an interaction function.

Next, with reference to the flow of assigning the priorities illustrated in FIG. 6A, a process for assigning the priorities of the content items illustrated in FIGS. 6B, 6C, and 6D will be described. The process in FIG. 6A starts in response to the HTML analyzer 202 determining that the HTML document contains a related content item. However, the timing at which the process in FIG. 6A starts is not limited to this timing. When it is determined that the HTML document includes a plurality of related content items in step S304 in FIG. 5, the HTML analyzer 202 executes the process in FIG. 6A for each content item.

In step S601, the priority assigning unit 203 determines whether or not the type of a target content item is a still image. Examples of types of the content items include a still image, a moving image, and audio. Since the description in all of FIGS. 6B, 6C, and 6D includes a still image that is specified by the <img> element, the determination in step S601 is YES, and the process proceeds to step S602. If the content item is not a still image, the process proceeds to step S605.

In step S602, the priority assigning unit 203 determines whether or not a link is set to the target still image. Since a link is set by the <a> element in FIG. 6B, the determination in step S602 is YES, and the process proceeds to step S604. Since a link is not set to the still image in FIGS. 6C and 6D, the determination in step S602 is NO, and the process proceeds to step S603.

In step S603, the priority assigning unit 203 determines whether or not a script is set to the target still image. Since a script is set by the script attribute of "onclick=" . . . "" in FIG. 6C, the determination in step S603 is YES, and the process proceeds to step S604. Since a script is not set to the still image in FIG. 6D, the determination in step S603 is NO, and the process proceeds to step S605.

In step S604, the target content item is the still image to which a link to another content item or a script is set; accordingly, the target content item is a content item related to interaction. Therefore, in step S604, the priority assigning unit 203 assigns a high priority to the target content item. On the other hand, in step S605, the target content item is the still image to which no link or script is set; accordingly, the target content item is not determined as a content item related to interaction. Therefore, the priority assigning unit 203 assigns a low priority to the target content item. As a result, priorities of the button images "button01.jpg" and "button02.jpg" in the descriptions in FIGS. 6B and 6C are set to be higher than a priority of the background image "background01.jpg" in the description in FIG. 6D.

Flow of Transmitting Content Item

An operation that occurs when the transmission apparatus 110 transmits the content items will be described with reference to FIGS. 7A and 7B. A case will be described in which the transmission apparatus 110 concurrently transmits the content items on a plurality of threads. Specifically, upon receiving the requests for acquisition of the content items from the reception apparatus 100, the transmission apparatus 110 generates, in addition to a main thread, as many sub-threads as the requested content items. The transmission apparatus 110 then manages the transmission of the content items by using the generated main thread and sub-threads. FIG. 7A illustrates an example of a process flow of the main thread, and FIG. 7B illustrates an example of a process flow of the sub-threads that are generated from the main thread.

First, the process flow of the main thread will be described with reference to FIG. 7A. The process in FIG. 7A starts in response to the transmission apparatus 110 receives the requests for acquisition of the plurality of content items from the reception apparatus 100 by using the plurality of streams. However, the timing at which the process in FIG. 7A starts is not limited to this timing.

In step S501, the main thread determines whether or not there is any request for acquisition for which a corresponding sub-thread is yet to be generated among the received requests for acquisition. For example, in a case in which the transmission apparatus 110 has received three requests for acquisition of a content item from the reception apparatus 100, the main thread determines whether or not three sub-threads have been generated. As a result of the determination in step S501, if the sub-threads have been generated for all of the received requests for acquisition, the process proceeds to step S503. On the other hand, if there remains a request for acquisition for which a corresponding sub-thread is yet to be generated, the process proceeds to step S502. In step S502, the main thread generates the sub-thread so that the sub-threads corresponding to all of the received requests for acquisition can be generated. Note that the following description is made on the assumption that the number of sub-threads that the main thread can generate is not limited to a particular number. Every time a sub-thread is generated, the process in FIG. 7B starts for the sub-thread.

In step S503, the main thread stores the received requests for acquisition in a queue. In step S504, the main thread rearranges the requests for acquisition in the queue in the order of priority. The main thread according to this embodiment rearranges the requests for acquisition stored in the queue so that the transmission of a content item corresponding to a request for acquisition with a high priority can be started preferentially among the content items corresponding to the requests for acquisition received from the reception apparatus 100. In a case in which a plurality of requests for acquisition have the same priority, the main thread rearranges the requests for acquisition stored in the queue so that the transmission of a content item that is displayed in an upper section of a web page can be started preferentially. The term "priority of each request for acquisition" herein means a priority of a stream used for the reception of the request for acquisition. In step S505, the main thread prepares for a variable I and initializes the variable I to 0.

In step S506, the main thread increments the value of I by 1. In this event, if the value of I becomes larger than the length of the queue, the value of I is set to 0. In step S507, the main thread releases a standby state of a sub-thread corresponding to an I-th stored request for acquisition from the top of the queue. This causes the I-th content item to start to be transmitted. That is, the transmission apparatus 110 preferentially starts to transmit a content item with a higher priority among the plurality of content items requested from the reception apparatus 100. Note that the sub-thread is kept in the standby state until the standby state is released in step S507. In step S508, the main thread waits for 100 milliseconds, which enables the transmission apparatus 110 to allocate a system resource for execution of the process of the sub-thread. In step S509, the main thread determines whether or not there is a sub-thread for which a transmission process has been completed. As a result of the determination in step S509, if there is a sub-thread for which the transmission process has been completed, the process proceeds to step S510; if there is no sub-thread for which the transmission process has been completed, the process returns to step S506.

In step S510, the main thread deletes from the queue the request for acquisition corresponding to the sub-thread for which the transmission process has been completed. In step S511, the main thread determines whether or not the queue is empty. As a result of the determination in step S511, if the queue is empty, the process ends; if the queue is not empty, the process returns to step S504.

Next, the process of the sub-thread will be described with reference to FIG. 7B. The process in FIG. 7B starts in response to the main thread of the transmission apparatus 110 generates a sub-thread in step S502. However, the timing at which the process in FIG. 7B starts is not limited to this timing.

In step S5001, the sub-thread waits for 100 milliseconds. This enables the transmission apparatus 110 to allocate system resources for the execution of processes of the other sub-threads and the main thread. In step S5002, the sub-thread determines whether or not the standby state has been released by the main thread. As a result of the determination in step S5002, if the standby state has been released, the process proceeds to step S5003; if the standby state has not been released, the process returns to step S5001.

In step S5003, the sub-thread transmits a predetermined amount of content to the reception apparatus 100 by using a stream that has been used for the reception of the corresponding request for acquisition. The predetermined amount herein may be common to all the sub-threads (all the content items) or may be larger for a content item with a higher priority. In this case, a wait time in step S508 may be 200 milliseconds or 300 milliseconds as necessary. The wait time in step S5001 may also differ depending on the sub-threads. Such a configuration makes it possible for a sub-thread corresponding to a content item with a higher priority, among the plurality of sub-threads, to transmit a larger data amount at a single opportunity (a single release of the standby state). Accordingly, it becomes more likely to complete the transmission of the content item with a higher priority earlier than the transmission of a content item with a lower priority.

In step S5004, the sub-thread determines whether or not the transmission of the content item has been completed. As a result of the determination in step S5004, if the transmission of the content item has not been completed, the process returns to step S5001; if the transmission of the content item has been completed, the process ends.

That is, the sub-thread determines whether or not the entire data of the content item (e.g., image) has been transmitted to the reception apparatus 100 in step S5003. If the transmission of the entire data of the content item has been completed, the process of the sub-thread ends.

The operation that occurs when the transmission apparatus 110 transmits the content items has been described above with reference to FIGS. 7A and 7B. However, the method for transmitting the content items is not limited thereto. The transmission apparatus 110 may allocate, on the basis of the priorities that are provided by the reception apparatus 100, transmission resources to the plurality of streams to transmit the plurality of content items to the reception apparatus 100 by using the streams.

As described above, the reception apparatus 100 according to this embodiment receives, from the transmission apparatus 110, a plurality of content items related to the HTML document by using the streams for which the priorities are assigned on the basis of the attribute information of the content items. In particular, by assigning a high priority to the stream corresponding to the content item related to interaction, it becomes more likely to download the content item related to interaction earlier than the other content items. This enables the user to perform interaction without waiting for the entire web page to be displayed, thereby increasing the convenience of the web page.

At the time the reception apparatus 100 starts the web browser, the reception apparatus 100 may allow the user to select either of the following modes: a mode employing the reception of the content items based on the priorities according to this embodiment and a mode not employing this reception. FIGS. 8A and 8B illustrate such a mode selection function. FIG. 8B illustrates an example of a mode selection screen. A mode selection screen 911 is displayed in a web browser 910. It is assumed that the mode employing the reception of the content items based on of the priorities according to this embodiment is called button-preferentially-displayed mode and that the mode not employing this reception is called normal mode. FIG. 8A illustrates an example of a flow of selecting the mode. A process in FIG. 8A starts in response to the reception apparatus 100 starts the web browser. However, the timing at which the process in FIG. 8A starts is not limited to this timing. In step S901, the display controller 204 causes the display apparatus to display the mode selection screen. In step S902, the reception apparatus 100 determines whether or not the user has selected the normal mode. As a result of the determination in step S902, if the user has selected the normal mode, the process ends; if the user has not selected the normal mode, the process proceeds to step S903. In step S903, the reception apparatus 100 employs the button-preferentially-displayed mode described in this embodiment, and the process ends.

This embodiment has described as an example the case in which the reception apparatus 100 concurrently receives the plurality of content items by using the plurality of streams established between the reception apparatus 100 and the transmission apparatus 110. However, the present invention is not limited thereto. For example, the transmitter/receiver 201 may establish at least one logical connection between the reception apparatus 100 and the transmission apparatus 110, and the priority assigning unit 203 may assign the priorities of the content items on the basis of whether or not a link to another content item or a script is set to the content items. Then, the transmitter/receiver 201 may notify the transmission apparatus 110, by using the established connection, of a message including a request for acquisition of a content item at a timing based on the priorities assigned by the priority assigning unit 203 and may receive the content item transmitted from the transmission apparatus 110 in response to the message. Specifically, the transmitter/receiver 201 may transmit, to the transmission apparatus 110, a request for acquisition of a content item that is yet to be acquired and has the highest priority and may receive the content item transmitted from the transmission apparatus 110 in response to the request. The transmitter/receiver 201 may then transmit a request for acquisition of a content item that is yet to be acquired and has the second highest priority and may receive the content item.

In FIG. 5, an example is illustrated in which the HTML analyzer 202 specifies all the content items contained in the HTML document, and then the priority assigning unit 203 assigns the priorities, and the transmitter/receiver 201 transmits the requests for acquisition to the transmission apparatus 110 on the basis of the priorities. However, the present invention is not limited thereto. For example, the HTML analyzer 202 may sequentially analyze the HTML document from the top line. Every time the HTML analyzer 202 specifies a content item, the priority assigning unit 203 may assign the priority of the content item, and the transmitter/receiver 201 may transmit a request for acquisition on the basis of the priority. Also, in FIGS. 7A and 7B, an example is illustrated in which the transmission apparatus 110 concurrently transmits the content items by using the plurality of sub-threads. However, the present invention is not limited thereto. For example, the transmission apparatus 110 may first transmit the entire data of a content item with a high priority and then start to transmit data of a content item with a low priority.

An operation of transmitting/receiving the content items in this case will be described with reference to FIGS. 9A to 9C. FIG. 9A illustrates an example of an excerpt of a description of an HTML document. This HTML document contains two content items: "image01.jpg" and "image02.jpg". No link or script is set to "image01.jpg", whereas a script is set to "image02.jpg". Accordingly, the priority assigning unit 203 assigns a higher priority to "image02.jpg" than to "image01.jpg".

FIG. 9B illustrates an example of a sequence when, in a case of not employing the method for assigning the priorities according to this embodiment, the reception apparatus 100 downloads "image01.jpg" and "image02.jpg" in FIG. 9A from the transmission apparatus 110. In this case, the reception apparatus 100 receives the plurality of content items contained in the HTML document by using a plurality of streams with the same priority.

First, a process of the reception apparatus 100 will be described. The HTML analyzer 202 detects "image01.jpg", and the transmitter/receiver 201 transmits a request for acquisition of "image01.jpg" to the transmission apparatus 110. Then, the HTML analyzer 202 detects "image02.jpg", and the transmitter/receiver 201 transmits a request for acquisition of "image02.jpg" to the transmission apparatus 110. In this case, "image01.jpg" and "image02.jpg" have the same priority. When the transmitter/receiver 201 receives the entire data of "image01.jpg" from the transmission apparatus 110, the display controller 204 starts to display "image01.jpg". When the transmitter/receiver 201 receives the entire data of "image02.jpg" from the transmission apparatus 110, the display controller 204 starts to display "image02.jpg".

Next, a process of the transmission apparatus 110 will be described. Upon receiving the request for acquisition of "image01.jpg", the transmission apparatus 110 first transmits a half of data of "image01.jpg" to the reception apparatus 100. Then, the transmission apparatus 110 receives the request for acquisition of "image02.jpg". Since the two content items have the same priority, the transmission apparatus 110 continuously transmits the other half of data of "image01.jpg" to the reception apparatus 100. The transmission apparatus 110 then transmits, to the reception apparatus 100, a half of data of "image02.jpg" and finally transmits the other half of data of "image02.jpg".

FIG. 9C illustrates an example of a sequence when, in a case in which the method for assigning the priorities according to this embodiment is applied, the reception apparatus 100 downloads "image01.jpg" and "image02.jpg" in FIG. 9A from the transmission apparatus 110. In the process of the reception apparatus 100, in addition to the process illustrated in FIG. 9B, the priority assigning unit 203 assigns a higher priority to "image02.jpg" than to "image01.jpg".

Upon receiving the request for acquisition of "image01.jpg", the transmission apparatus 110 first transmits a half of data of "image01.jpg" to the reception apparatus 100. Then, the transmission apparatus 110 receives the request for acquisition of "image02.jpg". Since the stream corresponding to "image02.jpg" has a higher priority than the stream corresponding to "image01.jpg", the transmission apparatus 110 transmits a half of data of "image02.jpg" to the reception apparatus 100 earlier than the other half of data of "image01.jpg". The transmission apparatus 110 then transmits, to the reception apparatus 100, the other half of data of "image02.jpg" and finally transmits the other half of data of "image01.jpg".

In this case, the transmitter/receiver 201 receives the entire data of "image02.jpg" prior to the entire data of "image01.jpg" from the transmission apparatus 110. Accordingly, the display controller 204 starts to display "image02.jpg" prior to "image01.jpg".

As described above, with the application of the approach illustrated in FIGS. 9A to 9C, the transmitter/receiver 201 transmits the request for acquisition of the content item on the basis of the priority prior to the HTML analyzer 202 analyzing the entire HTML document. As a result, the display controller 204 can immediately start to display the content item with a high priority.

Second Embodiment

The first embodiment has described mainly the example in which the priority assigning unit 203 assigns the priorities of the streams on the basis of the type of the content item or the presence and absence of a link and a script set thereto in order to preferentially download the content item related to interaction. This embodiment will describe an example in which, in addition to the basis of the first embodiment, a domain of a URL of a web page that is a transition destination of the link or script is used as the basis of assigning the priorities in step S305 in FIG. 5.

In a case in which the URL of the transition destination of the link or script has a different domain from the URL of the web page that is the transition source, an image to which the link or script is set might not be a content item that a user wishes to operate soon. For example, in a case in which transition to a menu screen is possible from a home screen of a web service, the home screen and the menu screen are usually managed by the same domain. On the other hand, in a case in which transition to a web page of another service is possible from a home screen of a web service, a web page having a different domain is usually displayed. In those cases, the user often wishes to move sooner to the menu screen from the home page. In addition, ad banners and the like, which have a low priority for the user, are often images to which a link or script to transition to another domain is set.

Accordingly, this embodiment will describe a mechanism for preferentially downloading a content item related to the transition to a web page having the same domain as the web page that is the transition source. The second embodiment is the same as the first embodiment except for the flow of assigning the priorities; therefore, a repeated description will be omitted.

A method for assigning the priorities based on the domain of the URL corresponding to the link or script will be described with reference to FIGS. 10A to 10D. FIG. 10A is a flowchart illustrating a detailed process in which the priority assigning unit 203 assigns the priorities in step S305 in FIG. 5. FIGS. 10B and 10C illustrate examples of excerpts of a description related to display of a button image to which the link to the menu screen is set, the menu screen being managed by the same domain as the displayed page. FIG. 10B illustrates an example of designating the link destination by using an absolute path, and FIG. 10C illustrates an example of designating the link destination by using a relative path. FIG. 10D illustrates an example of an excerpt of a description related to display of a button image to which a link to another web service is set, the web service being managed by another domain.

The process in FIG. 10A starts in response to the HTML analyzer 202 determining that the HTML document contains the content item. However, the timing at which the process in FIG. 10A starts is not limited to this timing.

FIG. 10A is different from FIG. 6A in that determination is performed in step S701. In the first embodiment, if the priority assigning unit 203 determines that the link is set to the still image content item in step S602 in FIG. 6A, the priority assigning unit 203 assigns a high priority to the content item. In addition, if the priority assigning unit 203 determines that the script is set to the still image content item in step S603, the priority assigning unit 203 also assigns a high priority to the content item. In contrast, in this embodiment, if the priority assigning unit 203 determines that the link is set in step S602 and if the priority assigning unit 203 determines that the script is set in step S603, the process proceeds to step S701.

In step S701, the priority assigning unit 203 determines whether or not the domain of the URL corresponding to the HTML document containing the target content item is the same as the domain of the URL corresponding to the link or script set to the target content item. Since the domains of the transition destination in FIGS. 10B and 10C and the transition source are the same, the determination in step S701 is YES, and the process proceeds to step S604. Since the domains of the transition destination and the transition source are not the same in FIG. 10D, the determination in step S701 is NO, and the process proceeds to step S605.

In step S604, the target content item is a still image to which the link or script is set, the link or script corresponding to the URL having the same domain as the URL corresponding to the HTML document, and accordingly, the priority assigning unit 203 assigns a high priority to the target content item. On the other hand, in step S605, the target content item is a still image to which the link or script is set, the link or script corresponding to the URL having a different domain from the URL corresponding to the HTML document, and accordingly, the priority assigning unit 203 assigns a low priority to the target content item. As a result, a priority higher than that of a button image "button03.jpg" in the description in FIG. 10D is set to each of the button images "button01.jpg" and "button02.jpg" in the description in FIGS. 10B and 10C.

As described above, the reception apparatus 100 according to this embodiment preferentially downloads the content item related to the transition to the web page having the same domain as the web page that is the transition source. Accordingly, the user is likely to be able to download earlier the content item related to an operation that the user wishes to perform soon than the other content items. As a result, the user can perform desired interaction at an early stage of a display process of the web page, thereby increasing the convenience of the web page.

This embodiment has described as an example the case of downloading the still image earlier than a moving image or audio. However, the present invention is not limited thereto. For example, in a moving image sharing site, the user may want to immediately start the reproduction of a moving image. In this case, by assigning a higher priority to the moving image than to the other types of content items, the convenience of the web page can be increased. Alternatively, without determining the type of content item in step S601, the reception apparatus 100 may assign the priority on the basis of whether or not a link or script is set to the content item.

This embodiment has described as an example the case of downloading the content item related to the transition to the web page having the same domain earlier than the content item related to the transition to the web page having another domain. However, the present invention is not limited thereto. For example, in a case in which the reception apparatus 100 is intended to consider as important the benefit of the advertiser, in order to preferentially display ad banners, the priority assigning unit 203 may assigns a high priority to the content item related to the transition to the web page having another domain.

This embodiment has described as an example the case in which the priority assigning unit 203 assigns a high priority to each content item in step S604 or assigns a low priority to each content item in step S605. However, the priorities may have more levels than the two levels of high and low. For example, in a case in which the priority assigning unit 203 can assign four priority levels, the priority assigning unit 203 assigns the highest priority to the still image to which the link or script to the same domain is set. In addition, the priority assigning unit 203 assigns the second highest priority to the still image to which the link or script to another domain is set and the third highest priority to a still image to which no link or script is set. Further, the priority assigning unit 203 may assign the fourth highest priority to a content item whose type is other than the still image. This can increase the convenience even for a user who desires a transition to a service of another domain, for example.

Third Embodiment

The second embodiment has described mainly the example of using, in addition to the criterion of the first embodiment, the domain of the URL of the web page that is the transition destination by using the link or script as the basis of assigning the priorities in step S305 in FIG. 5. This embodiment will describe an example of using a display size of an image as a basis of assigning the priorities in step S305.

This embodiment will describe a mechanism for categorizing content items on a web page into a background image and a button image and downloading the button image earlier than the background image. The third embodiment is the same as the first embodiment except for the flow of assigning the priorities; therefore, a repeated description will be omitted.

A method for assigning the priorities based on the display size of the image will be described with reference FIGS. 11A to 11D. The image displayed on a web page can be determined to be the background image on the basis of the display size in the following three cases. FIG. 11B illustrates an example of a case in which the area of the background image occupies a certain ratio or more of the area of a window in a web browser. In a window in a web browser 810 are displayed a background image 811, a sign-in button 812, and a help button 813. FIG. 11C illustrates an example of a case in which the width of the background image occupies a certain ratio or more of the width of the window. FIG. 11D illustrates an example of a case in which the height of the background image occupies a certain ratio or more of the height of the window.

FIG. 11A is a flowchart illustrating a detailed process in which the priority assigning unit 203 assigns the priority of the image in step S305 in FIG. 5. Note that the lowest priorities are assigned to the content items other than the image, for example. The process in FIG. 11A starts in response to the HTML analyzer 202 determines that the HTML document contains the content item. However, the timing at which the process in FIG. 11A starts is not limited to this timing.

In step S801, the priority assigning unit 203 acquires the width of the window of the web browser (DW) and the height of the window (DH) from the display controller 204. Although the width and the height of the window are used as DW and DH, respectively in this embodiment, it is also possible to use the width and the height of a display or the width and the height of a display region contained in the HTML document. The HTML document can designate the width and the height of the display region by a width attribute and a height attribute. In step S802, the priority assigning unit 203 acquires the width of the image (IW) and the height of the image (IH). In the HTML document, the width and the height of the image are designated by a width attribute and a height attribute of an <img> element. In step S803, the priority assigning unit 203 sets thresholds SS, SW, and SH.

In step S804, the priority assigning unit 203 determines whether or not the ratio of the area of the image (IW×IH) to the area of the window (DW×DH) is larger than SS. If the ratio of (IW×IH) to (DW×DH) is larger than SS, the target image is determined to be the background image, and the process proceeds to step S805. For example, when SS is 0.25, an image occupying a quarter or more of the window is determined to be the background image. On the other hand, if the ratio of (IW×IH) to (DW×DH) is lower than or equal to SS, the process proceeds to step S806.

In step S806, the priority assigning unit 203 determines whether or not the difference between the width of the window (DW) and the width of the image (IW) is smaller than SW. If the difference between DW and IW is smaller than SW, the target image is determined to be the background image, and the process proceeds to step S805. For example, when SW is 50, an image for which a difference between the width of the window (DW) and the width of the image (IW) is less than 50 px is determined to be the background image. On the other hand, if the difference between DW and IW is greater than or equal to SW, the process proceeds to step S807.

In step S807, the priority assigning unit 203 determines whether or not the difference between the height of the window (DH) and the height of the image (IH) is smaller than SH. If the difference between DH and IH is smaller than SH, the target image is determined to be the background image, and the process proceeds to step S805. For example, when SH is 50 and the difference between the height of the window (DH) and the height of the image (IH) is less than 50 px, the image is determined to be the background image. On the other hand, if the difference between DH and IH is greater than or equal to SH, the target image is determined to be a button image, and the process proceeds to step S808.

In step S805, since the target content item is an image in which at least one of the area, the height (the length in the vertical direction), and the width (the length in the lateral direction) on the web page displayed in the window exceeds the predetermined value, the image is determined to be the background image. Accordingly, the priority assigning unit 203 assigns a low priority to the target content item in step S805. On the other hand, in step S808, the target content item is an image in which each of the area, the height, and the width on the web page is less than or equal to the predetermined value. Thus, the image is determined to be the button image, and the priority assigning unit 203 assigns a high priority to the target content item.

As described above, the reception apparatus 100 according to this embodiment downloads the button image having a smaller display size earlier than the background image having a larger display size. This makes it more likely to download the content item related to the user operation earlier than the other content items, thereby increasing the convenience of the web page.

The image in this embodiment may be a still image or a moving image. In addition, this embodiment has described as an example the case in which the image having a small display size is downloaded earlier than the image having a large display size. However, the present invention is not limited thereto. For example, the image having a large display size may be a main content item and the image having a small display size may be a decorative, less important content item. In such a case, by assigning a higher priority to the image having a large display size than to the image having a small display size, the image desired by the user can be displayed preferentially.

Fourth Embodiment

The third embodiment has described mainly the example of using the display size of the image as the basis of assigning the priorities in step S305 in FIG. 5. This embodiment will describe an example of using a display position of an image as a basis of assigning the priorities in step S305. The fourth embodiment is the same as the first embodiment except for the flow of assigning the priorities; therefore, a repeated description will be omitted.

A method for assigning the priorities based on the display position of the image will be described with reference to FIGS. 12A and 12B. Among images displayed on a web page, an image that is likely to be operated by a user is often displayed in a display range of an initial screen of a web browser that displays the web page. On the other hand, an image that cannot be displayed until the screen is scrolled is often an image that is less likely to be operated or a background image. FIG. 12B illustrates an example of display in which an entire web page is not displayed in a display range of an initial screen of a web browser. A part of a web page 1111 is displayed in a web browser 1110. A sign-in button 1112 and a help button 1113 are displayed in the web browser 1110, and a part or all of a background image 1114 exists beyond the display range of the web browser 1110.

FIG. 12A is a flowchart illustrating a detailed process in which the priority assigning unit 203 assigns a priority of an image in step S305 in FIG. 5. The process in FIG. 12A starts in response to the HTML analyzer 202 determines that the HTML document contains a content item. However, the timing at which the process in FIG. 12A starts is not limited to this timing.

In step S1101, the priority assigning unit 203 acquires a width of the window of the web browser (DW) and a height of the window (DH) from the display controller 204. Although the width and the height of the window are used as DW and DH, respectively in this embodiment, it is also possible to use a width and a height of a display or a width and a height of a display region contained by the HTML document. In step S1102, the priority assigning unit 203 acquires a display position (IX, IY) of an image on the web page. IX and IY respectively correspond to an X-coordinate and a Y-coordinate of a point at which the upper left end of the image is displayed. In the HTML document, the display position of the image is designated by x and y of an <img> element or a style attribute. In step S1103, the priority assigning unit 203 sets thresholds DX and DY.

In step S1104, the priority assigning unit 203 determines whether or not the X-coordinate IX of the display position of the image is larger than (DW-DX). Even if IX is smaller than DW, a part of the image might not fall within the display region of the window, and therefore, DX is used to determine whether or not the display region of the window includes the entire image. As DX, for example, a value such as DW/10 or the width of the image may be set. If the determination in step S1104 is YES, the process proceeds to step S1105; if the determination in step S1104 is NO, the process proceeds to step S1106.

In step S1106, the priority assigning unit 203 determines whether or not the Y-coordinate IY of the display position of the image is larger than (DH-DY). As DY, for example, a value such as DH/10 or the height of the image may be set. If the determination in step S1106 is YES, the process proceeds to step S1105; if the determination in step S1106 is NO, the process proceeds to step S1107.

In step S1105, since the target content item is the image at least a part of which is not displayed within the display range of the initial screen of the web browser, the image is determined to be less likely to be operated. Accordingly, in step S1105, the priority assigning unit 203 assigns a low priority to that target content item. On the other hand, in step S1107, since the target content item is the image that is displayed entirely within the display range of the initial screen of the web browser, the image is determined to be likely to be operated. Accordingly, the priority assigning unit 203 assigns a high priority to the target content item.

As described above, the reception apparatus 100 according to this embodiment downloads the image that is displayed entirely on the initial screen earlier than the image that is not displayed entirely on the initial screen, on the basis of the display position of the image. This makes it more likely to download earlier the content item that is likely to be operated by the user than the other content items, thereby increasing the convenience of the web page.

Note that the image in this embodiment may be a still image or a moving image. This embodiment has described as an example the case of assigning the priority on the basis of whether or not the image is displayed within the display range of the initial screen in the web browser that displays the web page. However, the present invention is not limited thereto. For example, when the user scrolls the screen before the entire page is displayed, the content item displayed within a display region of a window at the scrolling position may be downloaded preferentially. Thus, an image that the user desires to see or to operate can be expected and downloaded preferentially.

This embodiment has described the case of assigning the priorities on the basis of whether or not the image is displayed within the display region of the window; the content items displayed within the display region of the window may have priorities. For example, in a map information service or the like, the transmitter/receiver 201 of the reception apparatus 100 transmits/receives map data that is segmented into tiles by using respective different streams. In this case, the priority assigning unit 203 can assign a higher priority to a stream corresponding to a specific tile than to the streams corresponding to the other tiles. Specifically, in the map displayed within the display region of the window, a high priority may be set to a map part near the center of the window, a map part clicked by the user, a map part corresponding to an address input by the user, and the like. This makes it more likely possible to immediately display information on a point that the user wishes to see, thereby increasing the convenience of the web page.

This embodiment has described mainly the case in which the reception apparatus 100 assigns the priorities related to the related content items constituting the web page specified in the HTML document. However, the present invention is not limited thereto. For example, the transmission apparatus 110 may transmit data representing the configuration of the web page to the reception apparatus 100, assign the priorities of the related content items specified in the data and transmit the related content items to the reception apparatus 100 on the basis of the assigned priorities. A specific example of a communication method of this case will be described below.

When the reception apparatus 100 requests the transmission apparatus 110 of an HTML document, the transmission apparatus 110 assigns the priorities of the related content items specified in the HTML document. As the method for assigning the priorities, as described above with reference to FIG. 6A for example, in a case in which the related content item is the image content item to which the link to another content item or script is set, a higher priority is assigned to such a content item than in a case in which the related content item is the image content item to which no link or script is set. However, the method for assigning the priorities is not limited thereto, and other methods may be employed.

When the priorities are assigned, the transmission apparatus 110 notifies the reception apparatus 100 of a notification message based on the priorities and transmits the HTML document to the reception apparatus 100. On the basis of the notification message provided from the transmission apparatus 110, the reception apparatus 100 establishes the streams for which the priorities are assigned and requests the transmission apparatus 110 of the related content items specified in the HTML document by using these streams. Note that the transmission apparatus 110 may include the information on the priorities in the HTML document to transmit the HTML document as the message based on the priorities. For example, the transmission apparatus 110 may include a predetermined HTML tag corresponding to a priority of each related content item at a part corresponding to the related content item in the HTML document to transmit the HTML document to the reception apparatus 100. Then, upon receiving the HTML document, the reception apparatus 100 may refer to the included HTML tag to determine the priorities of the related content items, which have been assigned by the transmission apparatus 110.

When the reception apparatus 100 transmits requests for acquisition of content items, in response to the requests, the transmission apparatus 110 transmits the related content items by using the streams that have been used for the transmission of the requests. Then, the reception apparatus 100 receives the related content items by using these streams. Also by this method, the reception apparatus 100 can receive the content items by using the streams having the priorities based on attribute information of the content items.

According to the above embodiments, by assigning the priorities of the logical connections depending on the content items, a specific content item is likely to be acquired immediately.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-046432, filed Mar. 9, 2015, which is hereby incorporated by reference herein in its entirety.

The invention claimed is:

1. A reception apparatus comprising:
   one or more hardware processors; and
   one or more memories which store instructions executable by the one or more hardware processors to cause the reception apparatus to perform at least:
   determining whether information for specifying processing executed in response to user operation on an image content item in a web page is set;
   setting higher priority on a first logical connection for receiving a first image content item from a transmission apparatus than priority of a second logical connection for receiving a second image content item from the transmission apparatus, in a case where it is determined that information for specifying processing executed in response to user operation on the first image content item in the web page is set and information for specifying processing executed in response to user operation on the second image content item in the web page is not set; and
   receiving image content items in the web page from the transmission apparatus by using logical connections according to the set priority.

2. The reception apparatus according to claim 1, wherein higher priority is set on the first logical connection than priority of the second logical connection, in a case where a link to another content item or a script is set as the information on the first image content item and no link to another content item and no script is set as the information on the second image content item.

3. The reception apparatus according to claim 1, wherein the instructions further cause the reception apparatus to perform:

notifying a transmission apparatus of the set priority so that the transmission apparatus transmits image content items in the web page according to the set priority.

4. The reception apparatus according to claim 3, wherein the transmission apparatus is notified of the set priority by a message including at least any of a HEADERS frame and a PRIORITY frame defined by HTTP/2.

5. The reception apparatus according to claim 3, wherein the transmission apparatus is notified of a message including a request for a content item at a timing based on the set priority.

6. The reception apparatus according to claim 1, wherein higher priority is set on the first logical connection than priority of the second logical connection, in a case where a link or script to a URL having a same domain as a URL corresponding to the web page is set on the first image content items and a link or script to a URL having a different domain from the URL corresponding to the web page is set on the second image content items.

7. The reception apparatus according to claim 1, wherein each of the logical connections used for reception of the content items in the web page is a connection for managing an order of a notification message transmitted from the reception apparatus to the transmission apparatus and a content item transmitted from the transmission apparatus to the reception apparatus.

8. The reception apparatus according to claim 1, wherein each of the logical connections used for reception of the content items in the web page is a stream defined by HTTP/2.

9. The reception apparatus according to claim 1, wherein whether the information is set is determined based on data representing configuration of the web page by an HTML document or an XHTML document.

10. The reception apparatus according to claim 1, wherein each of the image content items is a still image or a moving image.

11. A transmission apparatus comprising:
one or more hardware processors; and
one or more memories which store instructions executable by the one or more hardware processors to cause the transmission apparatus to perform at least:
determining whether information for specifying processing executed in response to user operation on an image content item in the web page is set;
transmitting a first image content item to a reception apparatus in preference to a second image content item, in a case where it is determined that information for specifying processing executed in response to user operation on the first image content item in the web page is set and information for specifying processing executed in response to user operation on the second image content item in the web page is not set.

12. The transmission apparatus according to claim 11, wherein the first image content item is transmitted to the reception apparatus by using a first logical connection on which higher priority is set than priority of a second logical connection for transmitting the second image content item to the reception apparatus.

13. A communication system including a transmission apparatus and a reception apparatus,
the reception apparatus configured to perform at least:
determining whether information for specifying processing executed in response to user operation on an image content item in a web page is set;
setting higher priority on a first logical connection for receiving a first image content item from the transmission apparatus than priority of a second logical connection for receiving a second image content item from the transmission apparatus, in a case where it is determined that information for specifying processing executed in response to user operation on the first image content item in the web page is set and information for specifying processing executed in response to user operation on the second image content item in the web page is not set; and
receiving image content items in the web page from the transmission apparatus by using logical connections according to the set priority,
the transmission apparatus configured to perform at least:
transmitting the image content items in the web page to the reception apparatus by using the logical connections according to the set priority.

14. The communication system according to claim 13, wherein higher priority is set on the first logical connection than priority of the second logical connection, in a case where a link to another content item or a script is set as the information on the first image content item and no link to another content item and no script is set as the information on the second image content item.

15. A communication method executed between a transmission apparatus and a reception apparatus, the method comprising:
determining whether information for specifying processing executed in response to user operation on an image content item in a web page is set;
setting higher priority on a first logical connection for transmitting a first image content item from the transmission apparatus to the reception apparatus than priority of a second logical connection for transmitting a second image content item from the transmission apparatus to the reception apparatus, in a case where it is determined that information for specifying processing executed in response to user operation on the first image content item in the web page is set and information for specifying processing executed in response to user operation on the second image content item in the web page is not set; and
transmitting image content items in the web page from the transmission apparatus to the reception apparatus by using logical connections according to the set priority.

16. The communication method according to claim 15, wherein higher priority is set on the first logical connection that priority of the second logical connection, in a case where a link to another content item or a script is set as the information on the first image content item and no link to another content item and no script is set as the information on the second image content item.

17. A non-transitory storage medium storing a computer-readable program for executing a communication method, the communication method comprising:
determining whether information for specifying processing executed in response to user operation on an image content item in a web page is set;
setting higher priority on a first logical connection for transmitting a first image content item from the transmission apparatus to the reception apparatus than priority of a second logical connection for transmitting a second image content item from the transmission apparatus to the reception apparatus, in a case where it is determined that information for specifying processing executed in response to user operation on the first image content item in the web page is set and information for specifying processing executed in response to user operation on the second image content item in the web page is not set; and transmitting image content items in the web page from the transmission apparatus to the reception apparatus by using logical connections according to the set priority.

18. The non-transitory storage medium according to claim 17, wherein higher priority is set on the first logical connection than priority of the second logical connection, in a case where a link to another content item or a script is set as the information on the first image content item and no link to another content item and no script is set as the information on the second image content item.

* * * * *